United States Patent [19]

Jasinski

[11] Patent Number: 5,239,677
[45] Date of Patent: Aug. 24, 1993

[54] METHOD AND APPARATUS FOR INITIATING COMMUNICATION ON AN ASSIGNED FREQUENCY

[75] Inventor: Leon Jasinski, Ft. Lauderdale, Fla.
[73] Assignee: Motorola, Inc., Schaumburg, Ill.
[21] Appl. No.: 724,017
[22] Filed: Jul. 1, 1991
[51] Int. Cl.$^5$ ............................................. H04B 7/26
[52] U.S. Cl. ................... 455/34.1; 455/54.2; 370/95.1
[58] Field of Search ............. 455/33.1, 34.1, 34.2, 455/54.1, 54.2; 370/95.1, 95.3

[56] References Cited

U.S. PATENT DOCUMENTS

4,815,073  3/1989  Grauel et al. ............... 370/95.1
5,134,615  7/1992  Freeburg et al. ............ 370/95.3

Primary Examiner—Reinhard J. Eisenzopf
Assistant Examiner—Chi Pham
Attorney, Agent, or Firm—Keith A. Chanroo; William E. Koch; Thomas G. Berry

[57] ABSTRACT

A portable transceiver system (100) has at least one base site (200) capable of communicating with at least one of a plurality of portable transceivers (108). The at least one base site (200) comprises communicators communicating on first and second frequencies (301, 302). The first frequency (301) comprises a plurality of sub-frequencies for communicating from the at least one base site to the plurality of portable transceivers (108), and the second frequency (302) comprises a plurality of time-slots for receiving call initiation signals from the plurality of portable transceivers (108). The at least one base site (100) further comprises a receiver (214) and a detector (218) receiving and detecting, respectively, when the call initiation signal is received from one of the plurality of portable transceivers (108), a channel assignor (220), coupled to the detector (218), allocates a frequency assignment for communicating with an initiating portable transceiver (108) on one of the plurality of sub-frequencies of the first frequency (321), and a transmitter (210) transmitting the frequency assignment to the plurality of portable transceivers (108). Each of the plurality of portable transceivers (108) comprises a portable transmitter transmitting the call initiation signal in one of the plurality of time slots to the at least one base site (200), and a receiver receiving the frequency assignment from the at least one base site (200). The at least one base site (200) uses the time related position of the time-slot as an address to communicate to the initiating portable transceiver (108).

10 Claims, 6 Drawing Sheets

METHOD AND APPARATUS FOR INITIATING COMMUNICATION ON AN ASSIGNED FREQUENCY

FIELD OF THE INVENTION

This invention relates in general to communication systems, and more specifically to a method and apparatus for initiating communication on an assigned frequency.

BACKGROUND OF THE INVENTION

Generally, acknowledge-back selective call receivers transmit information at a low data rate, typically 50 to 100 bits-per-second. The higher the number of bits used, the greater the probability of error, and especially at such a low data rate, one additional bit may result in a substantial increase in the received error rate. Thus, to ensure a reasonable error rate at this low data rate, the number of bits-per-transmission must be few.

Additionally, for known call-initiated portable transceiver systems, the portable transceivers transmit their addresses along with their initiation signals to a base site to enable the base site to determined which portable transceiver is requesting communication. A typically call initiated portable transceiver system, for example, a call initiation acknowledge-back pager within a paging system comprises a plurality of call initiation acknowledge-back pagers and at least one base site. The base site receives calls initiated by each of the call initiation acknowledge-back pagers which may be coupled to a public telephone network for establishing communication. The transmission of the address of the call initiation acknowledge-back pagers substantially increases the number of bits transmitted for a call initiation signal. This increase in the number of bits exacts a high penalty on the received error rate. Furthered by the unsynchronized and random fashion of call initiation signals, a system having a plurality of call initiation acknowledge-back pagers will suffer numerous collisions between call initiation signals. A collision is the simultaneous arrival of at least two call initiation signals at a base site from at least two call initiation acknowledge-back pagers. As a result, the base site cannot distinguish between the call initiation signals. Thus, a need exists for reducing the number of collisions between call initiation signals to improve the resulting error rates.

SUMMARY OF THE INVENTION

A portable transceiver system has at least one base site capable of communicating with at least one of a plurality of portable transceivers. The at least one base site comprises communication means communicating on first and second frequencies. The first frequency comprises a plurality of sub-frequencies for communicating from the at least one base site to the plurality of portable transceivers, and the second frequency comprises a plurality of time-slots for receiving call initiation signals from the plurality of portable transceivers. The at least one base site further comprises means for receiving and detecting when the call initiation signal is received from one of the plurality of portable transceivers, means, coupled to the detecting means, for allocating a frequency assignment for communicating with an initiating portable transceiver on one of the plurality of sub-frequencies of the first frequency, and means for transmitting the frequency assignment to the plurality of portable transceivers. Each of the plurality of portable transceivers comprises means for transmitting the call initiation signal in one of the plurality of time slots to the at least one base site, and means for receiving the frequency assignment from the at least one base site. The at least one base site uses the time related position of the time-slot as an address to communicate to the initiating portable transceiver.

BRIEF DESCRIPTION OF THE DRAWINGS

FIGS. 3A-D is a diagram of the frequencies in accordance with the preferred embodiment of the present invention.

DESCRIPTION OF A PREFERRED EMBODIMENT

Figure 1:
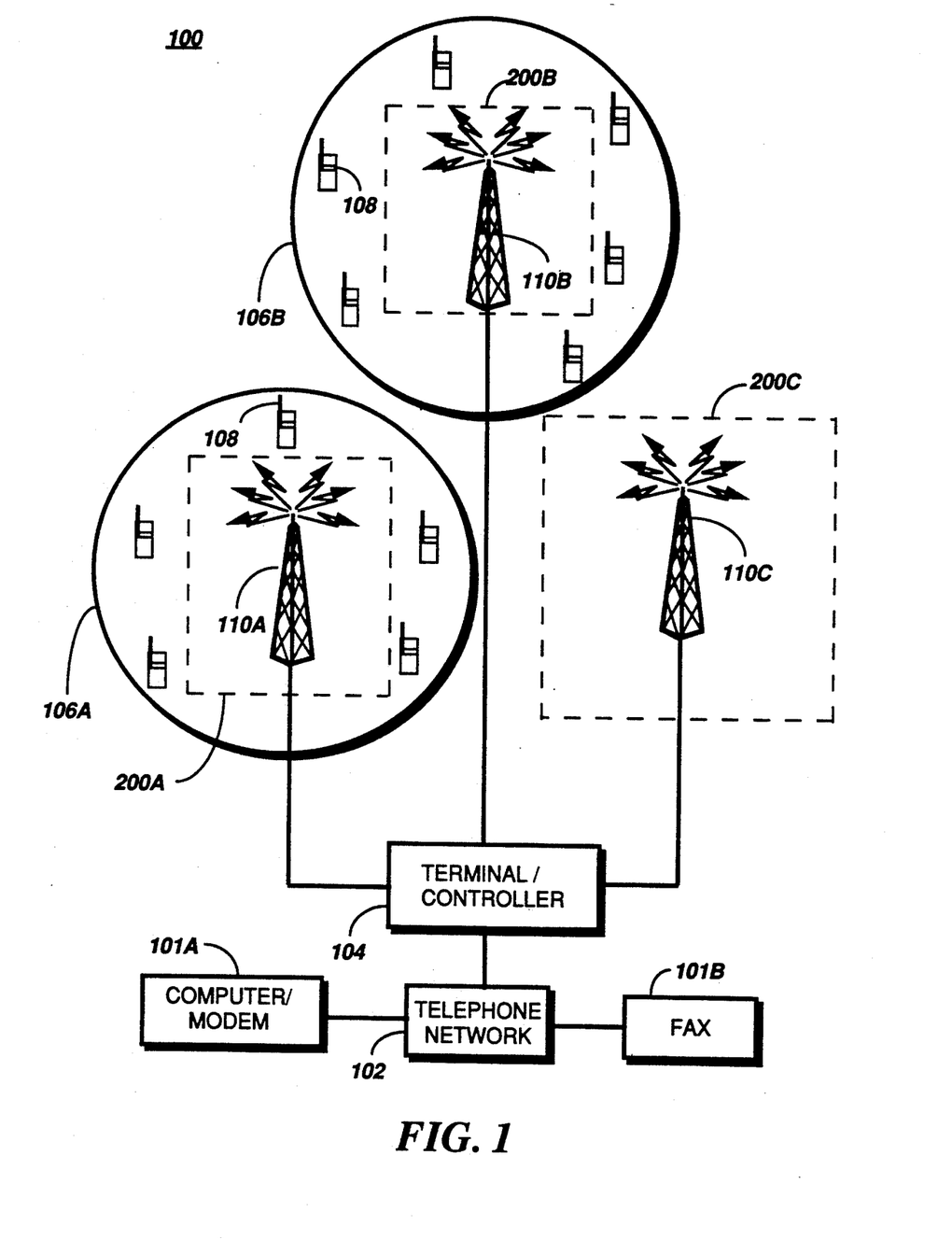
FIG. 1 is a block diagram of a communication system.

Referring to FIG. 1, a communication system, particularly, a portable transceiver system 100 is coupled to a computer via a modem 101A and/or a facsimile (FAX) 101B via a conventional public or private telephone network 102 known to those skilled in the art. The telephone network 102 is coupled to a terminal/controller 104 which in turn is coupled to a plurality of base sites 200A-C. The plurality of base sites 200A-C transmit and receive signals via its respective transmitters/receivers 110A-C. The base sites 200A-C have an associated coverage area (for example, 106A and 106B) into which signals from the terminal/controller 104 are broadcast and received by at least one of a plurality of communicators (e.g., portable transceiver 108). Once "contact" or connection is established with the telephone network 102, a user can proceed with a two-way communication. By conventional methods, "contact" is established by a user using the telephone (not shown) to dial the portable transceiver 108.

Alternatively and according to the present invention, the portable transceiver 108 establishes connection by accessing an assigned sub-frequency (i.e., the call initiation sub-frequency) and transmits a signal to initiate or to request communication with the base site 200A. Subsequent to the receipt of the call initiation signal, the base site 200A (e.g., the base site receiving the initiation signal) transmits the necessary control information to the plurality of portable transceivers 108 to enable synchronization and communication. After synchronization, the base site 200A allocates a communication channel to establish a link connection between a computer/modem 101A or a facsimile (FAX) 101B and the portable transceiver 108.

Figure 2:
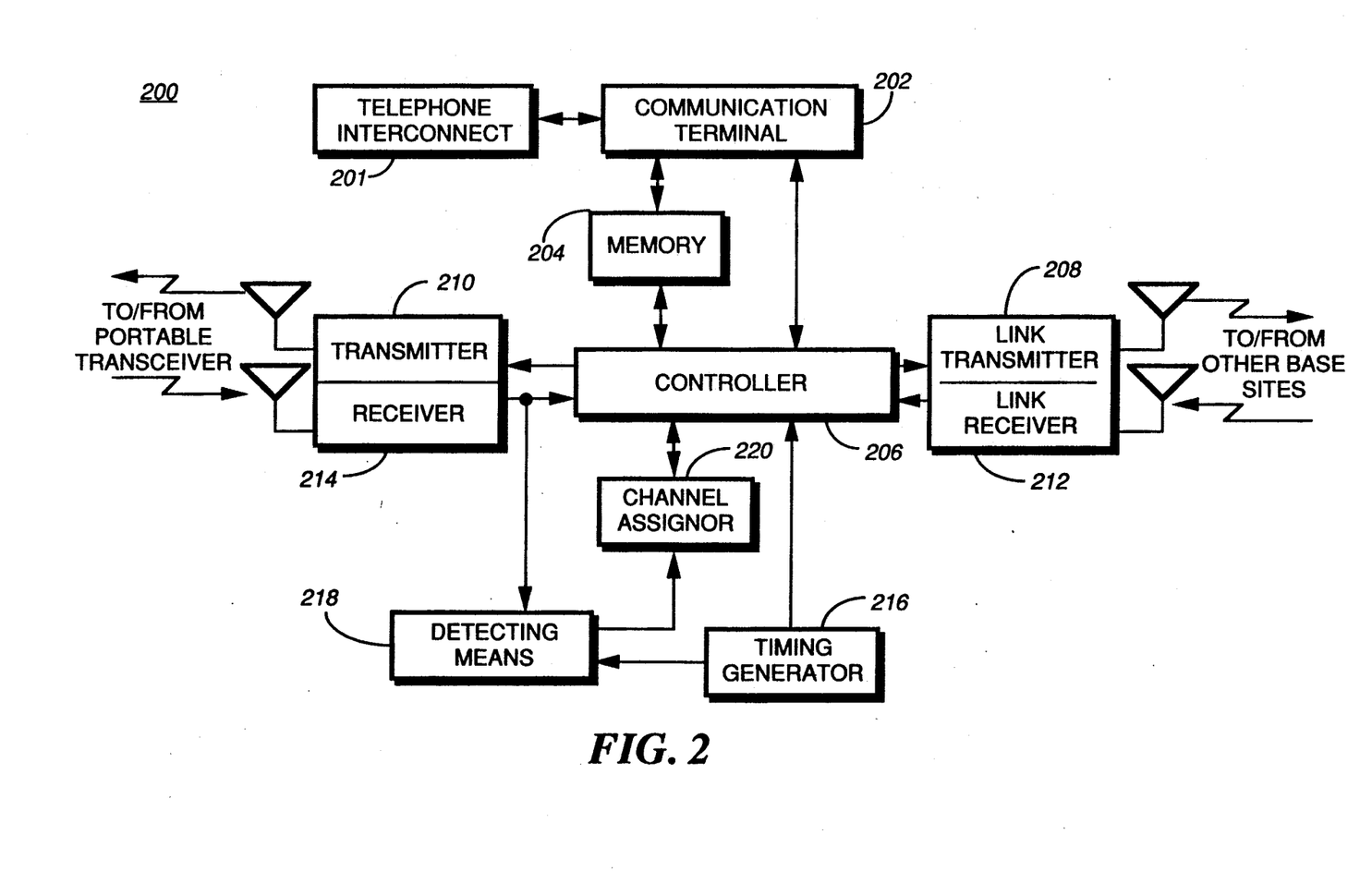
FIG. 2 is a block diagram of a base site in accordance with a preferred embodiment of the present invention.

Referring to FIG. 2, a more detailed block diagram of the preferred base site 200 is shown. The base site 200 comprises a telephone interconnect 201 which allows messages to enter into the portable transceiver system 100 through a public or private telephone network using, for example, a computer, a facsimile or an alphanumeric entry device (not shown). A communication terminal 202, for example the Motorola's MODEN PLUS Encoder, processes the information received through the telephone interconnect 201. A generated address and message decoded from the received information are stored in a memory 204 until the next transmission cycle.

As shown, the communication terminal 202 is coupled to a controller 206, which controls the operation of a link transmitter 208, a communicating transmitter 210, a link receiver 212, and a communicating receiver 214. The controller 206 suitable for use in the present invention is Motorola's MC6809 controller. A timing generator 216, coupled to the controller 206, provides a high accuracy clock to maintain system timing for communication and synchronization of the portable transceiver system 100 including all the base sites 200A-C and the plurality of transceivers 108. When the portable transceiver 108 transmits a signal (i.e., the call initiation signal) on the assigned sub-frequency or sub-channel of the second frequency, the receiving base site 200 processes the call initiation signal to enable communication with the portable transceiver that transmitted the call initiation signal. Specifically, the receiver 214 receives the call initiation signal, and measures the signal strength of the call initiation signal with a received signal strength indicator (RSSI) preferably contained within a detecting means 218. The RSSI determines if a valid initiation signal was received using conventional techniques. If a valid initiation signal was received, the controller 206 determines the position in which the call initiation signal arrived. The position in which the call initiation signal arrived corresponds to one of the plurality of time-slots. The position of the time-slot, for example a time slot number, is used as a temporary address to communicate to the requesting portable transceiver 108.

Figures 3A, 3B, 3C, 3D:
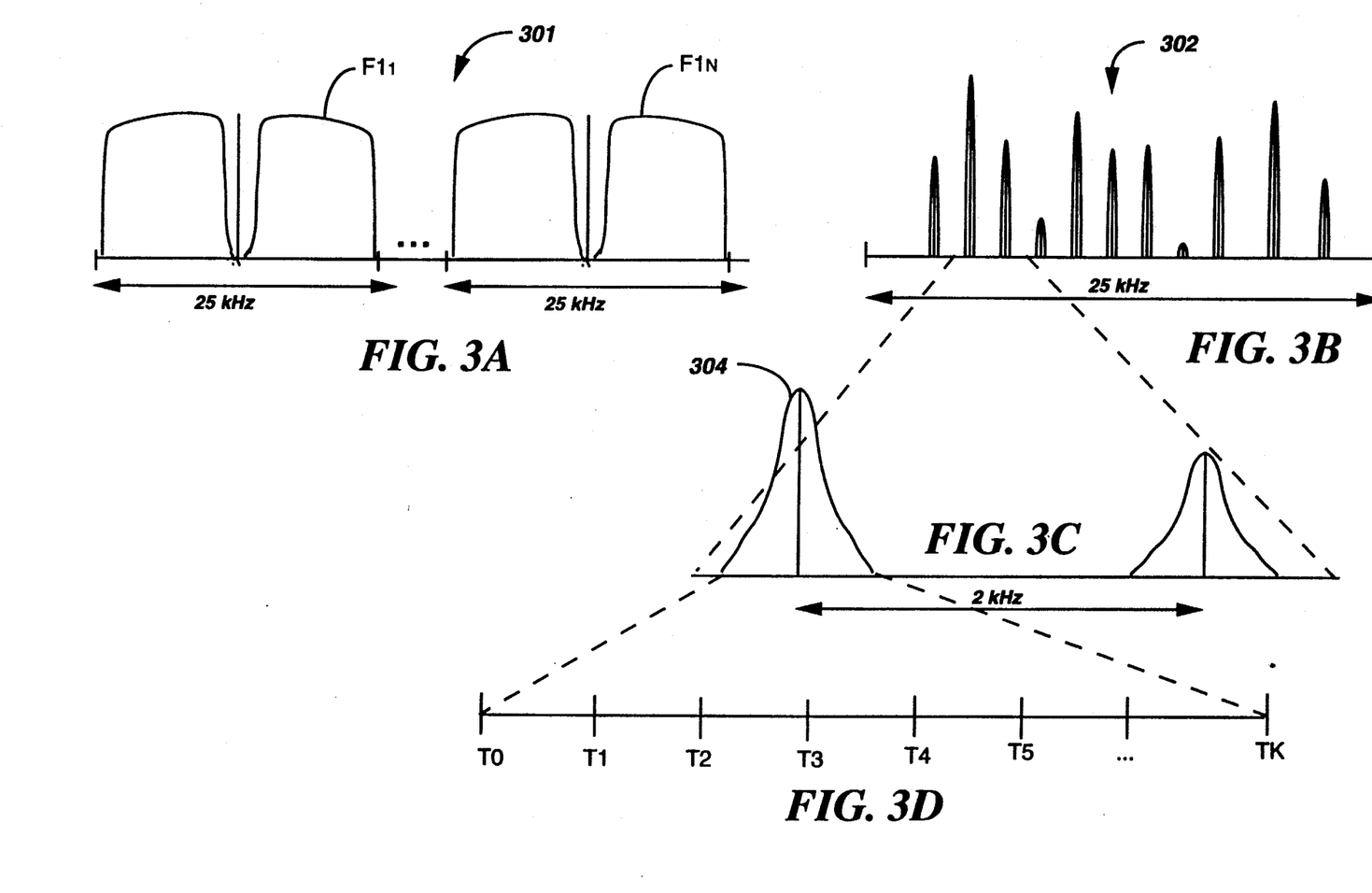

FIG. 3 illustrates the arrangement of the first and second frequencies showing the call initiation frequency 302. As shown, a typical portion of spectrum 301 is divided into sections of different 25 kHz sub-frequency ($F1_1$–$F1_N$) where $F1_1$ through to $F1_N$ comprises the plurality of first frequencies. Section 302 comprises the second frequency comprising a single 25 kHz sub-frequency. According to the invention, it is preferred that the second frequency 302 is substantially disjoint from the first frequency 301. For example, the first frequency 301 preferably comprising the plurality of sub-frequencies ($F1_1$–$F1_N$) reserved for outbound traffic (e.g., traffic form base sites to portable transceivers), and the second frequency 302 is reserved for inbound traffic (e.g., traffic from portable transceivers to base sites). The second frequency 302 is further divided into a plurality of sub-channels (sub-frequencies) 2.0 kHz apart. One of the plurality of sub-channels is used as the call initiation sub-channel 304. The call initiation sub-channel 304 is preferably divided into a plurality of "time-slots" (T0–TK) with a preferred duration of two-bits each typically comprising 5–10 msecs bit-times.

Preferably, an initiating portable transceiver 108 must begin its request for communication (call initiation) coincident to the start-time of one of the plurality of time-slots (T0–TK). In this way, the base site 200, upon receipt of a call initiation signal, will respond to the portable transceiver by using the call initiation time-slot number as a temporary address to enable the requesting portable transceiver 108 to identify the response as being directed to it. Thus, a portable transceiver 108 initiates a call by ensuring that it transmits its call initiation signal coincident with one of the start-times of the plurality time-slot (T0–TK), and by using the location number of the time-slot as its address, the portable transceiver 108 accesses a sub-frequency assignment sent from the base site 200 with the same time-slot number.

Operationally, the base sites 200 of the portable transceiver system 100 monitors the call initiation sub-frequency 304 (second frequency) by a monitoring means included in a detecting means 218 to determine when one of the plurality of portable transceivers 108 has transmitted a call initiation signal. The detecting means 218 determines when a valid call initiation signal is received, preferably by measuring the received signal strength against a pre-determined threshold. A channel assignor 220 measures the plurality of sub-frequencies to select or allocate an available one of the plurality of remaining sub-frequencies ($F1_1$–$F1_N$) to be assigned to the portable transceiver 108. This sub-frequency allocation is transmitted to the requesting portable transceiver 108 using the time-slot number in which the call initiation was received as a temporary address. Thus, the requesting portable transceiver 108 identifies the time-slot number as its address to obtain the sub-frequency assignment. In this way, the portable transceiver 108 initiates communications with the base site 200 by sending a call initiation signal within one of the time-slots (T0–TK) of the call initiation sub-frequency 304. By using the time-slot number as its address, the requesting portable transceiver 108 avoids the transmission of its long address sequence. This significantly reduces the probability of collisions between the unsynchronized call initiation signals because a the very short transmission time.

The controller 206 and a timing generator 216 determine the control and synchronization information to be sent to the portable transceiver 108 to enable the portable transceiver 108 to access the allocated sub-frequency. The communicating transmitter 210 transmits the control and synchronization information to the plurality of portable transceivers, and the portable transceiver 108 that sent the call initiation signal will access this information by decoding the time-slot number. In this way, the base site 200 communicates to the portable transceiver 108 that sent the call initiation signal by using the time-slot number as the address of the portable transceiver 108. Once the portable transceiver 108 identifies the time-slot number, it synchronizes to the assigned sub-frequency ($F1_1$–$F1_N$), and communication between the base site 200 and the portable transceiver 108 is established.

Figure 4:
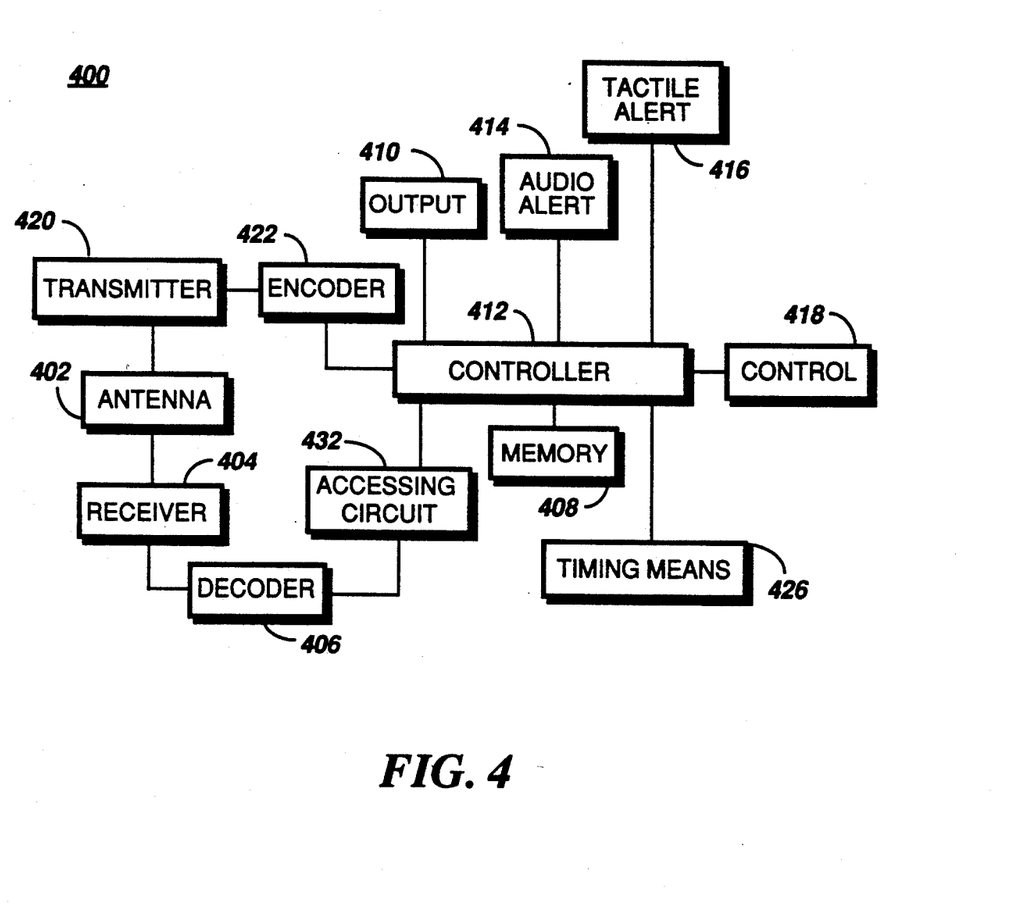
FIG. 4 is a block diagram of a portable transceiver in accordance a preferred embodiment of with the present invention.

Referring to FIG. 4, the portable transceiver 108 in accordance with the preferred embodiment, for example, a selective call radio receiver 400 is shown. The selective call receiver 400 is capable of initiating a call to the base site 200 within the portable transceiver system 100. For call initiation, it is assumed that the selective call receiver 400 is already synchronized to the portable transceiver system 100 in a conventional manner. A controller 412 and an encoder 422 encode the preferred two bits to be transmitted at a preferred data rate of 100 bits-per-second to the portable transceiver system 100. The controller 412 in conjunction with the timing means 426 determine the transmission time to enable coincident transmission with one of the plurality of time-slots. The determined transmission time or time-slot number is stored in a memory 408 as a temporary address for identifying a subsequent response from the base site 200. In this way, the selective call receiver 400 uses its time-slot number as a temporary address to avoid sending a long address for identification. By not sending address, the selective call receiver 400 sends a substantially fewer number of bits in the call initiation signal. This reduces the probability collisions between the call initiation signals from the plurality of selective call receiver 400, although the call initiations signals are generated in a random fashion.

An encoded call initiation signal is transmitted by a transmitter 420 via an antenna 402. Subsequent to the transmission, the portable transceiver 108 waits for a response from the base site 200. When the base site 200 responses to the call initiation signal, the receiver module 404 receives a radio frequency (RF) signal via the antenna 402 and generates a recovered signal suitable for processing by a decoder 406 in a manner well known to those skilled in the art. The decoder 406 converts the signal to a received address and control information, the received address (time-slot number) is compared to the address stored in memory 408. When the received address corresponds to the stored address, the selective call receiver 400 acquires the allocated sub-frequency contained in the control information, and by conventional methods, begins communication with the base site 200.

Communications from the base site 200 to the selective call receiver 400 is at a higher data rate than the data rate used by the selective call receiver 400 in transmitting the call initiation signal. After receipt of a message, the decoder 406 determines which format to use to decode the message by examining preferably a control format bit. The controller 412 stores the received message in memory 408 and alerts the user that a message has been received for example, either by an audio alert 414 (e.g., speaker) or a tactile alert 416 (e.g., vibrator). An output module 410 automatically, or when manually selected by controls 418, presents the message, such as by displaying the message on a display.

Figure 5:
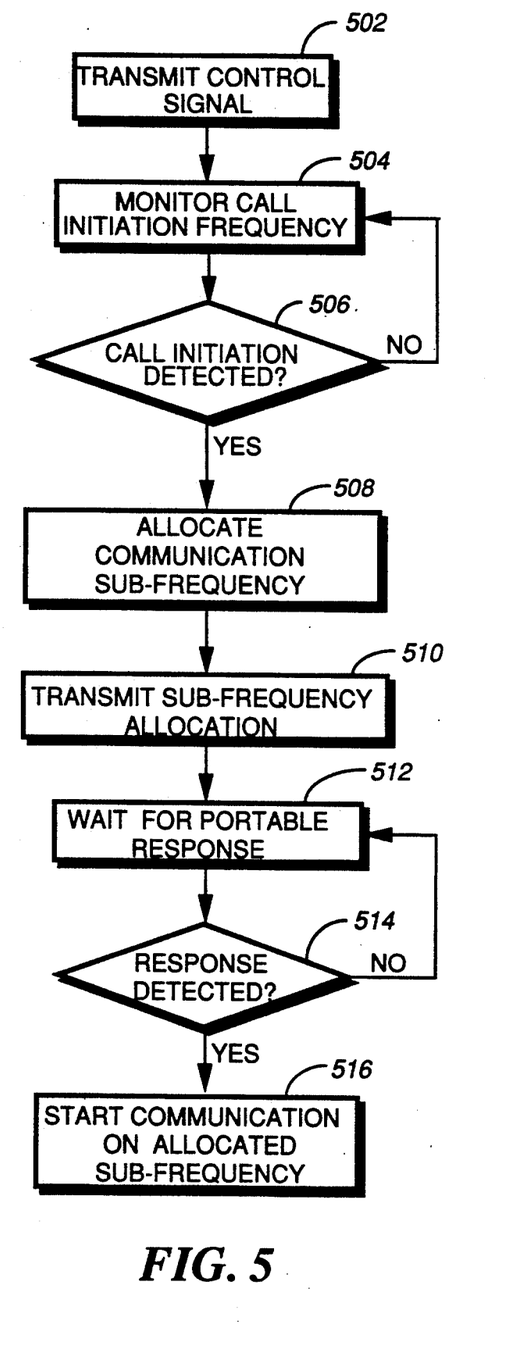
FIG. 5 is a flow diagram illustrating the steps executed by the base site of FIG. 2.

FIG. 5 is a flow diagram illustrating the steps executed by the base site 200 of FIG. 2 according to the preferred embodiment of the invention. Initially, the portable transceiver system 100, specifically the base sites 200 transmit control signals (step 502) to enable the plurality of portable transceivers 108 to synchronize to the base sites 200. The assigned call initiation sub-frequency 302 is continuously monitored (step 504) to detect the occurrences of call initiation signals from the plurality of portable transceiver 108. Step 506 checks if a valid call initiation signal was detected, and if not, the process continues to monitor the call intiation frequency (step 504). Alternatively, if a valid call initiation was detected, one of the plurality of unused sub-frequencies (F2-FN) is allocated to facilitate communication with the requesting portable transceiver 108 (step 508). Step 510 transmits the sub-frequency allocation along with or corresponding to the time-slot information as a temporary address to the requesting portable transceiver 108. Subsequently, the base site 200 waits for a response from the portable transceiver 108 on the allocated sub-frequency (step 512). Upon detection of a verified response (step 514), communication begins between the base site 200 and the portable transceiver 108 using the allocated sub-frequency (step 516). Otherwise, the base site 200 continues to wait for a valid response from the portable transceiver 108 (step 512) until a pre-determined "time-out" period. In this way, the portable transceiver 108 may initiate a call to the base site without sending a long address sequence at the conventional low data rate. The elimination of the transmission of the portable transceiver's address improves the error rate, because collisions between call initiation signals are significantly reduced.

Figure 6:
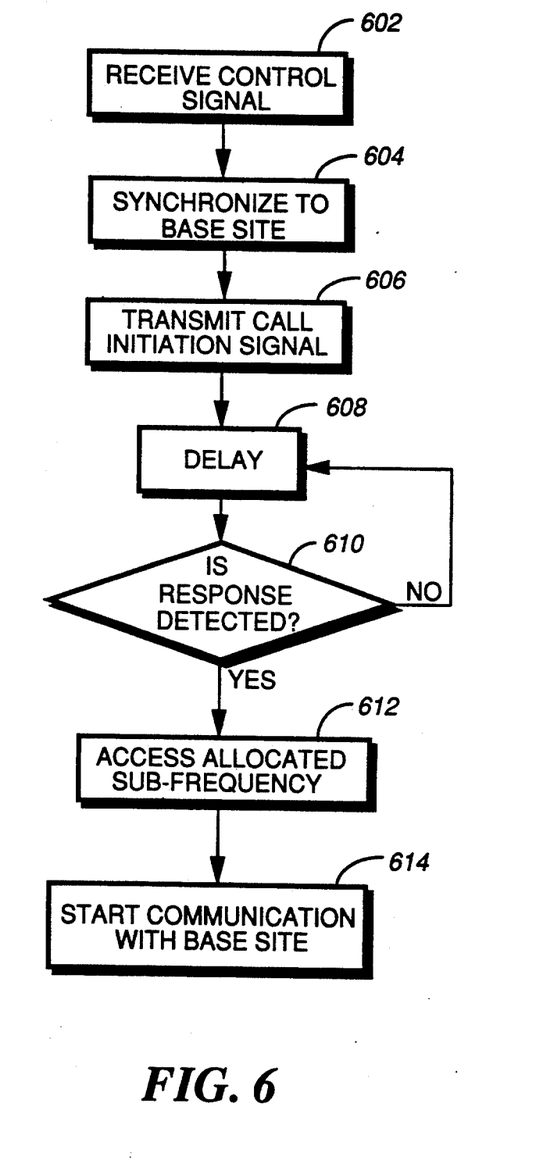
FIG. 6 is a flow diagram illustrating the steps executed by the portable transceiver of FIG. 4.

FIG. 6 is a flow diagram illustrating the steps executed by the portable transceiver of FIG. 4 according to the preferred embodiment of the invention. When the portable transceiver 108 is "turned-on", it receives control signals from the base site 200 (step 602) which is used to synchronize to the base site 200 (step 604). In step 606, the portable transceiver 108 transmits a call initiation signal to the base site 200 to request communication with the base site 200. Subsequent to the transmission of the call initiation signal, the portable transceiver 108 waits for a response from the base site 200 (step 608). When a response is detected with a valid time-slot information (step 610), the portable transceiver 108 decodes the information to determine the sub-frequency assignment. In step 612, the allocated sub-frequency is accessed, and communication begins with the base site 200 (step 614). In this way, the portable transceiver 108 decodes the transmitted time-slot information to determine the frequency assignment to enable communication with the base site. This temporary time-slot identification eliminates the need for the portable transceiver 108 to send its address when initiating communication. Thus, by using the time-slot position as a temporary address, a significant reduction in collisions between call initiation signals is achieved because the short transmission time of the call initiation signals. The reduction in the number of collisions among call initiation signals improves the resulting error rates.

I claim:

1. A portable transceiver system having at least one base site capable of communicating with at least one of a plurality of portable transceivers, the at least one base site, comprising:

communication means for communicating on first and second frequencies, the first frequency comprising a plurality of sub-frequencies for communicating from said at least one base site to the plurality of portable transceivers, and the second frequency comprising a plurality of time-slots for receiving call initiation signals from the plurality of portable transceivers;

means for receiving and detecting when the call initiation signal is received from one of the plurality of portable transceivers;

means, coupled to the detecting means, for allocating a frequency assignment for communicating with an initiating portable transceiver on one of the plurality of sub-frequencies of the first frequency; and means for transmitting the frequency assignment to the plurality of portable transceivers; each of the plurality of portable transceivers, comprising:

means for transmitting the call initiation signal in one of the plurality of time slots to the at least one base site; and means for receiving the frequency assignment from the at least one base site, the at least one base site using the time related position of the time-slot as an address for communicating to the initiating portable transceiver 2. The portable transceiver system according to claim 1 wherein the transmitting means of the communication means transmits information to the plurality of portable transceivers to enable the plurality of portable transceivers synchronizing to the portable transceiver system.

3. The portable transceiver system according to claim 1 wherein the receiving means of the communication means receives information from the plurality of portable transceivers.

4. The portable transceiver system according to claim 1 wherein the detecting means comprises a monitoring means for monitoring the call initiation sub-frequency for determining the transmission time-slot of the call initiation signal.

5. The portable transceiver system according to claim 1 wherein the allocating means comprises a means for measuring a received signal strength indicator of the plurality of sub-frequencies of the first frequency for allocating one of the plurality of the sub-frequencies for communication.

6. A portable transceiver for communicating with at least one base site, comprising:
   receiving means for receiving control and message information on a first frequency comprising a plurality of sub-frequencies for communicating from at least one base site to the portable transceivers;
   transmitting means for transmitting a call initiation signal on a second frequency, the second frequency comprising a plurality of time-slots for facilitating the transmission of the call initiation signal from the portable transceiver to the at least one base site, the portable transceiver assigns the time related position of the time slot in which the call initiation signal was transmitted as an address for communicating with the at least one base site;
   determining means coupled to the receiving means for determining the sub-frequency of the plurality of sub-frequencies assigned by the at least one base site for communicating in response to the call initiation; and
   accessing means for accessing the sub-frequency assigned for communicating with the at least one base site in response to the determining means.

7. The portable transceiver according to claim 6 wherein the receiving means comprises a synchronizing means for synchronizing said portable transceiver to the at least one base site.

8. The portable transceiver according to claim 6 wherein the determining means includes a means for decoding the sub-frequency assigned by the at least one base site.

9. In a portable transceiver system, a method for facilitating a portable transceiver initiated communication, comprising the steps of:
   (a) the portable transceiver transmitting a call initiation signal on one of a plurality of time slots of a second frequency;
   (b) a base site receiving the call initiation signal within one of the plurality time slots of the second frequency;
   (c) the base site determining an address from the time related position of the time slot in which the call initiation signal was received; and
   (d) the base site transmitting a response on a first frequency using the time related position of the time slot in which the call initiation was received as the address for allocating a frequency assignment for communicating with the portable transceiver.

10. In a portable transceiver, a method by a portable transceiver for initiating communication, comprising the steps of:
   (a) receiving control information from a base site on a first frequency;
   (b) transmitting a call initiation signal in a selected one of a plurality of time slots on a second frequency;
   (c) receiving information from the base site on the first frequency using the time related position of the time slot as an address for decoding a frequency assignment for communication between the portable transceiver and the base site; and
   (d) the portable transceiver verifying the time related position of the call initiation signal as the address to determine that the received information is being directed to the portable transceiver.

* * * * *